United States Patent
Kobayashi et al.

(10) Patent No.: US 7,542,766 B2
(45) Date of Patent: Jun. 2, 2009

(54) MOBILE COMMUNICATION SYSTEM, COMPRESSED-MODE CONTROLLING METHOD FOR THE SAME SYSTEM, AND BASE AND MOBILE STATIONS IN THE SAME SYSTEM

(75) Inventors: Yutaka Kobayashi, Kawasaki (JP); Makoto Uchishima, Kawasaki (JP); Natsuhiko Nakayauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/211,042

(22) Filed: Aug. 24, 2005

(65) Prior Publication Data

US 2006/0270408 A1   Nov. 30, 2006

(30) Foreign Application Priority Data

May 30, 2005   (JP)   ............................. 2005-157019

(51) Int. Cl.
  *H04W 36/00*   (2009.01)
(52) U.S. Cl. .................. 455/440; 455/443; 455/436; 455/444; 455/437; 455/438; 455/439; 455/441; 455/442; 370/230; 370/230.1; 370/231; 370/232; 370/233; 370/234; 370/235; 370/247
(58) Field of Classification Search ............... 455/440, 455/257, 436, 444, 437, 438, 439, 441, 442, 455/443; 370/230, 230.1, 231, 232, 233, 370/234, 235
See application file for complete search history.

(56) References Cited

U.S. PATENT DOCUMENTS

| 5,293,645 | A  | * | 3/1994  | Sood ........................ 455/456.2 |
| 6,208,631 | B1 | * | 3/2001  | Kim ............................. 370/332 |
| 6,327,471 | B1 | * | 12/2001 | Song ........................... 455/440 |
| 6,456,847 | B1 | * | 9/2002  | Lilja et al. ................... 455/437 |
| 6,469,995 | B1 | * | 10/2002 | Voyer et al. ................. 370/331 |
| 6,498,933 | B1 | * | 12/2002 | Park et al. .................... 455/436 |
| 6,597,679 | B1 | * | 7/2003  | Willars ........................ 370/342 |
| 6,615,044 | B2 | * | 9/2003  | Tigerstedt et al. ........... 455/437 |

(Continued)

FOREIGN PATENT DOCUMENTS

CN   1464665   12/2003

(Continued)

OTHER PUBLICATIONS

Mobile Station Location based on Hybrid of Signal Strength and Time of Arrival—Dr. Ghassan Kbar 0-7895-2367—06/05 Jul. 11-13, 2005 IEEE.*

(Continued)

*Primary Examiner*—Rafael Pérez-Gutiérrez
*Assistant Examiner*—Nimesh Patel
(74) *Attorney, Agent, or Firm*—Katten Muchin Rosenman LLP

(57) ABSTRACT

In a mobile communication system in which a compressed mode can be activated at the time of hand over, or when a base station which the mobile station is in communication with is switched to another base station, the distance between the mobile station and at least one of the plurality of base stations which is currently in communication with the mobile station is measured; and the activation of the compressed mode is controlled according to the measured distance. The activation of a compressed mode is controlled according to the distance between the base station and the mobile station.

10 Claims, 14 Drawing Sheets

U.S. PATENT DOCUMENTS

| | | | |
|---|---|---|---|
| 6,757,319 B1* | 6/2004 | Parsa et al. | 375/141 |
| 2002/0045448 A1* | 4/2002 | Park et al. | 455/436 |
| 2002/0082017 A1 | 6/2002 | Hattori | |
| 2002/0086682 A1* | 7/2002 | Naghian | 455/456 |
| 2003/0031143 A1 | 2/2003 | Faerber | |
| 2005/0227732 A1* | 10/2005 | Hiraki | 455/561 |
| 2006/0073828 A1* | 4/2006 | Sipila | 455/436 |

FOREIGN PATENT DOCUMENTS

| | | |
|---|---|---|
| EP | 0 812 119 | 12/1997 |
| GB | 2 338 866 | 12/1999 |

OTHER PUBLICATIONS

3GPP TS 25.212 V6.4.0 3RD Generation Partnership Project; Technical Specification Group Radio Access Network; Multiplexing and Channel Coding (FDD) Release 6, Mar. 2005.

3GPP TS 25.211 V3.12.0 3RD Generation Partnership Project; Technical Specification Group Radio Access Network; Physical channels and mapping of transport channels onto physical channels (FDD) Release 1999, Sep. 2002.

European Search Report dated Apr. 3, 2008, from the corresponding European Application.

Chinese Office Action dated May 23, 2008, from the corresponding Chinese Application.

* cited by examiner

MOBILE COMMUNICATION SYSTEM, COMPRESSED-MODE CONTROLLING METHOD FOR THE SAME SYSTEM, AND BASE AND MOBILE STATIONS IN THE SAME SYSTEM

CROSS REFERENCE TO RELATED APPLICATIONS

This application is based on and hereby claims priority to Japanese Application No. 2005-157019 filed on May 30, 2005 in Japan, the contents of which are hereby incorporated by reference.

BACKGROUND OF THE INVENTION (1) Field of the Invention

The present invention relates to a mobile communication system, a compressed-mode controlling method for the same system, and base and mobile stations in the same system. The invention relates particularly to the art suitable for use in controlling a compressed mode defined by 3GPP (3rd Generation Partnership Project) when different frequency hand over is performed.

(2) Description of Related Art

FIG. 13 is a block diagram showing an example of a W-CDMA (Wideband-Code Division Multiple Access) mobile communication system. The system of FIG. 13 includes, for example, two base stations (BTS) 100 and 200 and one mobile station (MS) 300. The mobile station 300 accesses, via a radio channel, the base stations 100 and 200 in cells 101 and 102, which are formed by the base stations 100 and 200, respectively.

Here, when the mobile station 300, which is in communication with the base station 100, moves from the cell 101 to the adjacent cell 102, the so-called hand over is performed. That is, if the mobile station 300 moves into an overlap area between the cell 101 and the cell 102, or the area where not only a signal from the base station 100 but also a signal from the base station 200 can be received, the mobile station 300 receives a signal from the base station 200, thereby detecting the presence of the base station 200, and switches the target of communication from the base station 100 to the base station 200 at a certain timing (for example, when the signal reception level from the base station 200 exceeds the signal reception level from the base station 100).

At this time, if the frequency used in the cell 101 differs from the frequency used in the cell 102, 3GPP defines that communication processing called a "compressed mode" is to be performed at the time of "hand over". That is, during the communication performed between the base station 100 and the mobile station 300, the base station 100 notifies the mobile station 300 of the activation of the "compressed mode", and then compresses at least a part of the transmit data (slot) to the mobile station 300, to make a gap (a transmission gap period in which data transmission is not performed) in the transmission slot, and the mobile station 300 measures the signal reception level of a different frequency from the base station 200 during a transmission gap period. As a result, when the signal reception level from the base station 200 exceeds the signal reception level from the base station 100, the mobile station 300 carries out hand over, switching to the frequency used in the cell 102. Here, in such a "compressed mode", as the frequency is switched, not only the base station 200 (100) but also the mobile station 300 can compress a part of the uplink slot to the base station 200 (100), to make a gap (transmission gap period) therein. The details of the "compressed mode" are described in the following non-patent document 1.

[Non-Patent Document 1] 3rd Generation Partnership Project (3GPP); Technical Specification Group Radio Access Network; "TS 25.212 V6.4.0 (2005-03) Multiplexing and channel coding (FDD) (Release 6)".

As already described, when the mobile station 300 moves into the adjacent cell 102, control needs to be performed so that a "compressed mode" is activated when the mobile station 300 comes apart from the base station 100 (cell 101), coming closer to the base station 200 (cell 102). In contrast, when the mobile station 300 is located close to the base station [for example, when the mobile station 300 is close to the base station 100 (in a base station vicinity area 111 in FIG. 14)], which the mobile station 300 is currently in communication with, it is not necessary to activate a "compressed mode". However, in currently used systems, a "compressed mode" can be erroneously activated even in the above circumstance, so that useless processing is performed by the base station 100, the base station 200, and the mobile station 300.

SUMMARY OF THE INVENTION

With the foregoing problems in view, an object of the present invention is to make it possible to evaluate the distance between base stations and a mobile station, to control the activation of a "compressed mode" according to the distance.

In order to accomplish the above object, the present invention uses the following mobile communication system, a compressed-mode controlling method for the same system, and base and mobile stations in the same system.

(1) As a generic feature, there is provided a communication system including a plurality of base stations and a mobile station communicable with the plurality of base stations, in which mobile communication system a compressed mode can be activated at the time of hand over, or when a base station which the mobile station is in communication with is switched to another base station, the mobile communication system comprising: a distance measuring means which measures the distance between the mobile station and-at least one of the plurality of base stations which is currently in communication with the mobile station; and a control means which controls the activation of the compressed mode according to the distance measured by the distance measuring means.

(2) As a preferred feature, the control means includes: a comparing unit which compares the distance measured by the distance measuring means with a specific threshold value; and a compressed-mode activation prohibiting unit which prohibits the activation of the compressed mode if the measured distance is smaller than the threshold value as a result of comparison by the comparing unit.

(3) As another preferred feature, the distance measuring means serves a function of a signal reception level distance-estimating unit which estimates the distance between the above-mentioned base station and the mobile station based on a result of measurement of a signal reception level from the base station, the measurement being performed on the mobile station.

(4) As yet another preferred feature, the distance measuring means serves a function of a propagation delay amount distance-estimating unit which estimates the distance between the above-mentioned base station and the mobile station based on a result of measurement of the amount of propagation delay in data communication between the base station and the mobile station.

(5) As a further preferred feature, the distance measuring means serves a function of a GPS (Global Positioning System) distance-estimating unit which estimates the distance between the above-mentioned base station and the mobile station based on a result of measurement of the locations of the base station and the mobile station by means of the GPS.

(6) As a still further preferred feature, the distance measuring means serves a function of a more-than-one distance measuring unit which measures, during communication performed in parallel between the mobile station and two or more of the base stations, the distances between the mobile station and the two or more base stations respectively, and the compressed-mode activation prohibiting unit prohibits the activation of the compressed mode if at least one of the distances measured by the more-than-one distance measuring unit is smaller than the threshold value.

(7) As another generic feature, there is provided a compressed-mode controlling method for a mobile communication system which includes a plurality of base stations and a mobile station communicable with the plurality of base stations, in which mobile communication system a compressed mode can be activated at the time of hand over, or when a base station which the mobile station is in communication with is switched to another base station, the method comprising: measuring the distance between the mobile station and at least one of the plurality of base stations which is currently in communication with the mobile station; and controlling the activation of the compressed mode according to the measured distance.

(8) As a preferred feature, the method further comprises prohibiting the activation of the compressed mode if the measured distance is smaller than a specific threshold value.

(9) As another preferred feature, the distance between the above-mentioned base station and the mobile station is estimated based on a result of measurement of a signal reception level from the base station, the measurement being performed on the mobile station.

(10) As yet another preferred feature, the distance between the base station and the mobile station is estimated based on a result of measurement of the amount of propagation delay in data communication between the base station and the mobile station.

(11) As a further preferred feature, the distance between the base station and the mobile station is estimated based on a result of measurement of the locations of the base station and the mobile station by means of the GPS (Global Positioning System).

(12) As a still further preferred feature, during communication performed in parallel between the mobile station and two or more of the base stations, the distances between the mobile station and the two or more base stations are measured respectively, and the activation of the compressed mode is prohibited if at least one of the measured distances is smaller than the threshold value.

(13) As yet another generic feature, there is provided a base station in a mobile communication system which includes a plurality of base stations and a mobile station communicable with the plurality of base stations, in which mobile communication system a compressed mode can be activated at the time of hand over, or when a base station which the mobile station is in communication with is switched to another base station, the base station comprising: a distance measuring means which measures the distance between the mobile station and at least one of the plurality of base stations which is currently in communication with the mobile station; and a control means which controls the activation of the compressed mode according to the distance measured by the distance measuring means.

(14) As a preferred feature, the control means includes: a comparing unit which compares the distance measured by the distance measuring means with a specific threshold value; and a compressed-mode activation prohibiting unit which prohibits the activation of the compressed mode if the measured distance is smaller than the threshold value as a result of comparison by the comparing unit.

(15) As another preferred feature, the distance measuring means serves a function of a signal reception level distance-estimating unit which estimates the distance between the above-mentioned base station and the mobile station based on a result of measurement of a signal reception level from the base station, the measurement being performed on the mobile station.

(16) As yet another preferred feature, the distance measuring means serves a function of a propagation delay amount distance-estimating unit which estimates the distance between the above-mentioned base station and the mobile station based on a result of measurement of the amount of propagation delay in data communication between the base station and the mobile station.

(17) As a further preferred feature, the distance measuring means serves a function of a GPS distance-estimating unit which estimates the distance between the above-mentioned base station and the mobile station based on a result of measurement of the locations of the base station and the mobile station by means of the GPS (Global Positioning System).

(18) As a still further preferred feature, the distance measuring means serves a function of a more-than-one distance measuring unit which measures, during communication performed in parallel between the mobile station and two or more of the base stations, the distances between the mobile station and the two or more base stations respectively, and the compressed-mode activation prohibiting unit prohibits the activation of the compressed mode if at least one of the distances measured by the more-than-one distance measuring unit is smaller than the threshold value.

(19) As a further generic feature, there is provided a mobile station in a mobile communication system which includes a plurality of base stations and a mobile station communicable with the plurality of base stations, in which mobile communication system a compressed mode can be activated at the time of hand over, or when a base station which the mobile station is in communication with is switched to another base station, the mobile station comprising: a distance measuring means which measures the distance between the mobile station and at least one of the plurality of base stations which is currently in communication with the mobile station; a control information generating means which generates control information for controlling the activation of the compressed mode according to the distance measured by the distance measuring means; and a control information sending means which sends the control information generated by the control information generating means to the base station which is in communication with the mobile station.

(20) As a preferred feature, the control information generating means includes: a comparing unit which compares the distance measured by the distance measuring means with a specific threshold value; and a compressed-mode activation prohibiting control information generating unit which generates compressed-mode activation prohibiting control information for prohibiting the activation of the compressed mode if the measured distance is smaller than the threshold value as a result of comparison by the comparing unit.

The present invention evaluates the distances between base stations and a mobile station. If the evaluation result reveals that at least one of the distances is small, the activation of a compressed mode is restrained (prohibited), so that an unnecessary activation of the compressed mode, is prevented, whereby unnecessary processing, such as detection of the adjacent cell and hand over, will also be prevented.

Other objects and further features of the present invention will be apparent from the following detailed description when read in conjunction with the accompanying drawings.

DESCRIPTION OF THE PREFERRED EMBODIMENT(S)

(A) First Embodiment

Figure 1:
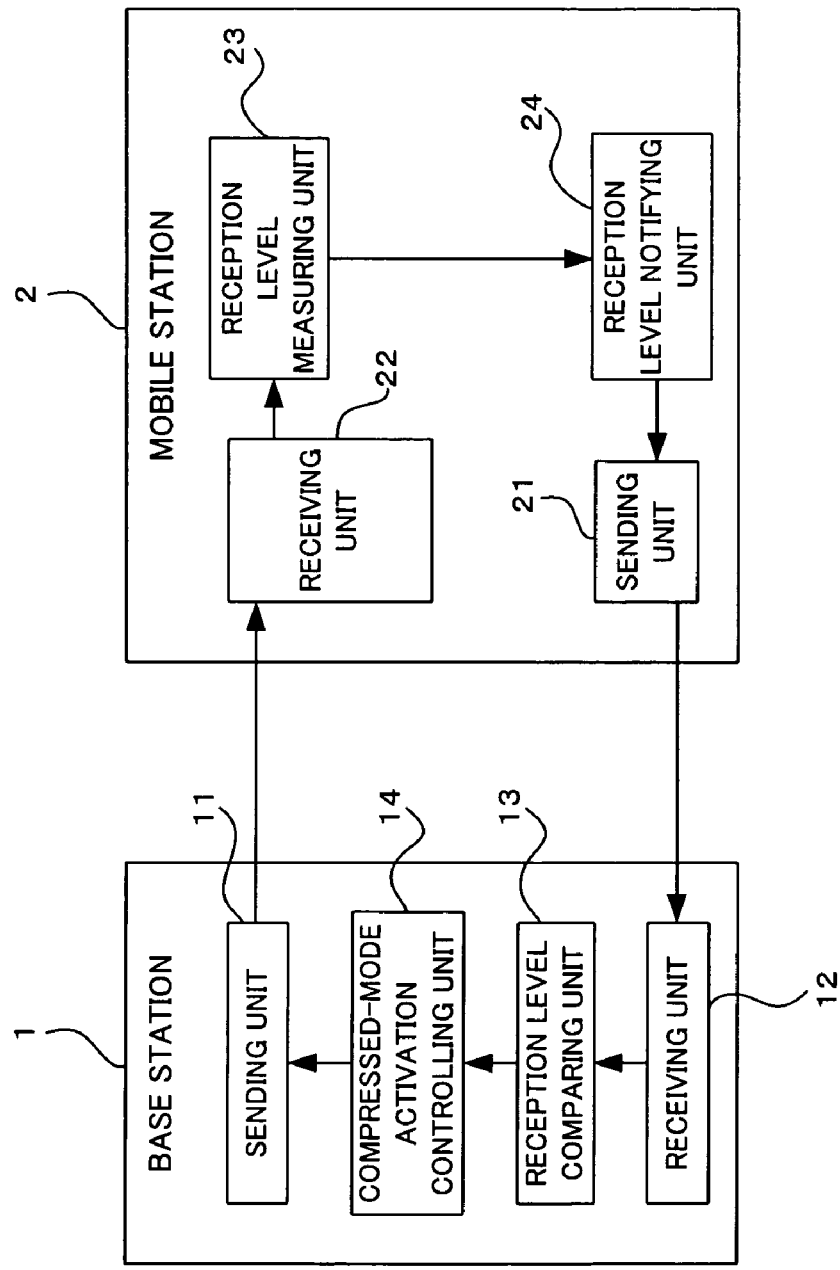
FIG. 1 is a block diagram showing a construction of a W-CDMA mobile communication system according to a first embodiment of the present invention.

FIG. 1 is a block diagram showing a construction of a W-CDMA (Wideband-Code Division Multiple Access) mobile communication system according to a first embodiment of the present invention. The system of FIG. 1 includes a base station 1 and a mobile station 2, which can access the base station 1 via a radio channel for communication when located in a cell formed by the base station 1. The important part of the base station 1 includes a sending unit 11, a receiving unit 12, a reception level comparing unit 13, and a compressed-mode activation controlling unit 14. On the other hand, the important part of the mobile station includes a sending unit 21, a receiving unit 22, a reception level measuring unit 23, and a reception level notifying unit 24.

Here, on the base station 1, the sending unit 11 sends data to the mobile station 2 at a specific radio frequency, and provides necessary transmission processing functions such as encoding, modulating, and up-converting of the transmit data. The receiving unit 12 receives data sent from the mobile station 2 via a radio channel, and provides necessary reception functions such as down-converting, demodulating, and decoding of the received data.

The reception level comparing unit 13 compares reception level information, which is measured by the reception level measuring unit 23 of the mobile station 2 and is received via the receiving unit 12, with a specific threshold value for the reception level information. If the comparison result obtained by the reception level comparing unit 13 reveals that the reception level information received from the mobile station 2 is smaller than the specific threshold value, and the compressed-mode activation controlling unit 14 hereby makes a decision that the distance between the base station 1 and the mobile station 2 is larger than a specific distance, the compressed-mode activation controlling unit 14 activates a compressed mode (specifically, a part of a transmission slot is compressed, thereby generating a transmission gap period, in which data transmission is not performed). On the other hand, if the comparison result reveals that the above reception level information is not smaller than the above threshold value, and the compressed-mode activation controlling unit 14 hereby makes a decision that the distance between the base station 1 and the mobile station 2 is smaller than the specific distance, it restrains (prohibits) the activation of the compressed mode.

That is, the receiving unit 12 functions as a distance measuring means for measuring the distance between the base station 1 and the mobile station 2, in particular, as a signal reception level distance-estimating unit, which estimates the distance between the base station 1 and the mobile station 2 based on the reception level information from the mobile station 2, i.e., a result of measurement of the signal level of a received signal from the base station 1 on the mobile station 2. The above-mentioned reception level comparing unit 13 and the compressed-mode activation controlling unit 14 serve as a control means for controlling the activation of a compressed mode in accordance with the measured distance between the base station 1 and the mobile station 2. Further, the compressed-mode activation controlling unit 14 also functions as a compressed mode activation prohibiting unit for prohibiting the activation of the compressed mode if a result of comparison by the reception level comparing unit 13 reveals that the measured distance is smaller than the threshold value.

On the mobile station 2, the sending unit 21 sends uplink transmit data to the base station 1 at a specific radio frequency, and it also serves necessary transmission processing functions such as encoding, modulating, and up-converting to a radio frequency, of the transmit data. The receiving unit 22 receives downlink data sent from the base station 1 through a radio channel, and it also serves necessary reception processing functions such as down-converting, demodulating, and decoding, of the received signal.

The reception level measuring unit 23 measures the signal reception level on the receiving unit 22, i.e., the downlink signal reception level from the base station 1. The reception level notifying unit 24 generates the measurement result obtained by the reception level measuring unit 23 as the above-mentioned reception level information, and the reception level information is sent to the base station 1 via the sending unit 21.

The subject of the reception level measurement is preferably a channel, e.g., a common pilot channel (CPICH), on which power control is not to be performed irrespective of the distance between the base station 1 and the mobile station 2. In such a common channel, the reception level on the mobile station 2 is high when the mobile station 2 is close to the base station 1, while it is low when the mobile station 2 is far from the base station. Hence, it is possible to decide the distance between the base station 1 and the mobile station 2 based on the reception level. In cases where a common pilot channel is subjected to the reception level measurement, the reception level on the mobile station 2 which is used in controlling in the present example, is, for example, CPICH-RSCP (Received Signal Code Power) and CPICH-Ec/No. Here, "RSCP" means desired wave reception power for use in evaluating the strength of a received wave from the base station 1; "Ec/No" is a ratio of the energy per one-chip desired wave to the in-band received power density.

Figure 2:
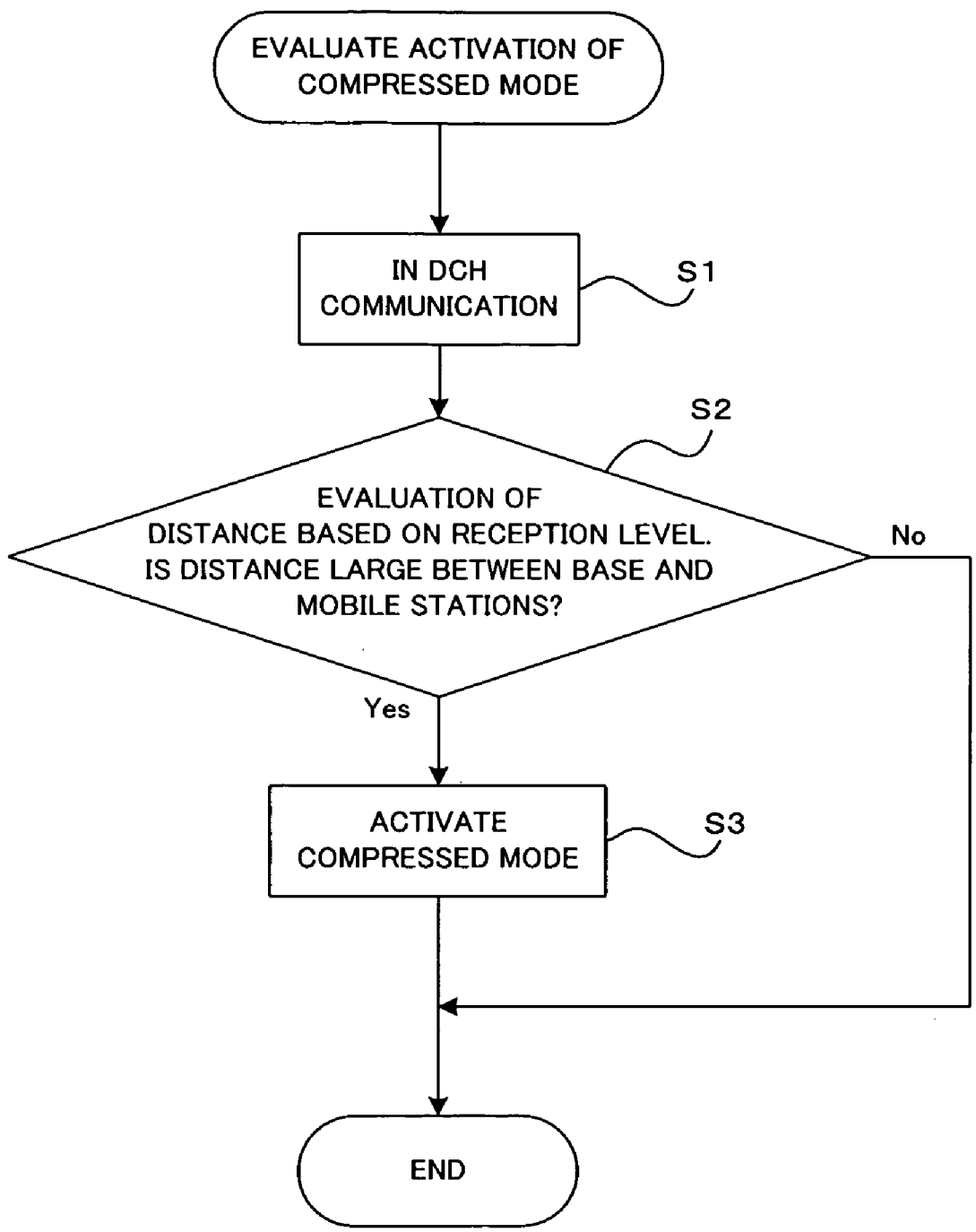
FIG. 2 is a flowchart indicating an operation (compressed mode control method) of the system of FIG. 1.

Now, an operation of a system with the above construction will be described with reference to FIG. 2.

For example, while the mobile station 2 is communicating with the base station 1 over a dedicated channel (DCH) (step S1), the measurement result obtained by the reception level measuring unit 23 is notified to the base station 1 via the reception level notifying unit 24 and the sending unit 21 at specific periods or at random. Upon reception of the notification information (reception level information) on the base station 1, the reception level comparing unit 13 compares the reception level information with the above-mentioned threshold value, and the compressed-mode activation controlling unit 14 evaluates whether or not the distance between the base station 1 and the mobile station 2 is larger than a specific distance (step S2).

As a result, when the reception level, which is notified by the mobile station 2, is smaller than the threshold value, the compressed-mode activation controlling unit 14 decides that the distance between the base station 1 and the mobile station 2 is larger than the specific distance, and then activates a compressed mode (from Yes-route of step S2 to step S3) In contrast, if the reception level information, which is notified by the mobile station 2, is not smaller than the above threshold value, the compressed-mode activation controlling unit 14 decides that the distance between the base station 1 and the mobile station 2 is smaller than the specific distance, and does not activate a compressed mode (prohibits the activation; No route of step S2).

As described above, the present embodiment evaluates the distance between the base station 1 and the mobile station 2, and the activation of the compressed mode is restrained in cases where the distance therebetween is smaller than the specific distance. This will prevent an unnecessary activation of a compressed mode, so that unnecessary processing, such as detection of the adjacent cell and hand over, will be prevented.

(A1) Modified Example of the First Embodiment

Figure 3:
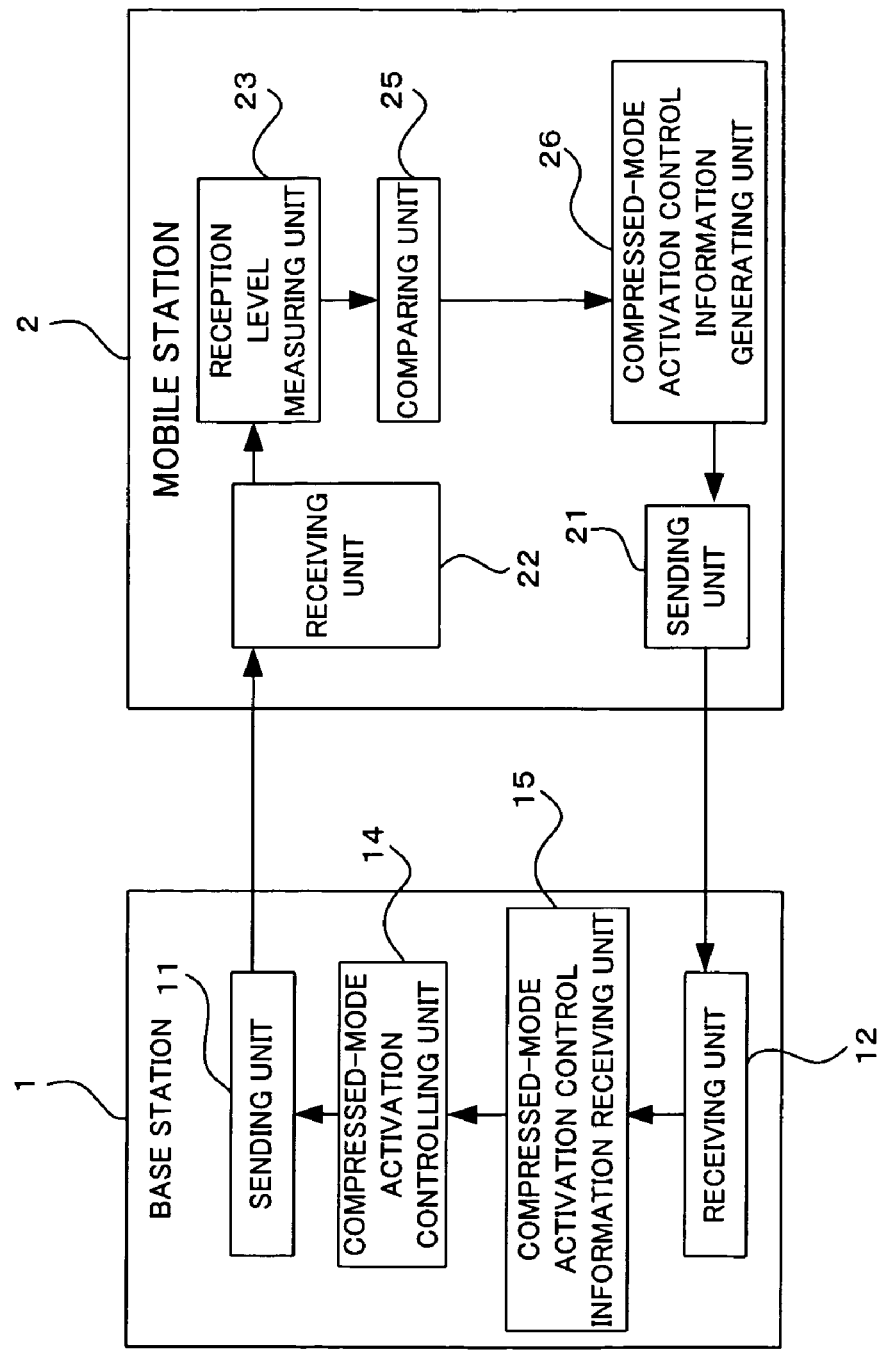
FIG. 3 is a block diagram showing a modified example of the system of FIG. 1.

FIG. 3 is a block diagram showing a modified example of the above-described W-CDMA mobile communication system of FIG. 1. The system of FIG. 3 differs from the construction already described with reference to FIG. 1 in that the base station 1 has a compressed-mode activation control information receiving unit 15 in place of the reception level comparing unit 13, and in that the mobile station 2 has a comparing unit 25 and a compressed-mode activation control information generating unit 26 in place of the reception level notifying unit 24. Like reference numbers and characters designate similar parts or elements throughout several views of the present embodiments unless otherwise described.

Here, in the mobile station 2, the comparing unit 25 compares a downlink signal reception level, which is measured by the reception level measuring unit 23, with a specific threshold value for the signal reception level. If the comparison result obtained by the comparing unit 25 reveals that the reception level is not smaller than the above threshold value, and a decision is thereby made that the distance between the base station 1 and the mobile station 2 is smaller than the specific distance, the compressed-mode activation control information generating unit (control information generating means, compressed-mode activation prohibiting information generating unit) 26 generates control information (compressed-mode activation prohibiting control information) for prohibiting the activation of the compressed mode. The generated control information is sent to the base station 1 via the sending unit 21, which serves as a control information sending means. Here, if the reception level is smaller than the specific threshold, thereby indicating that the distance between the base station 1 and the mobile station 2 is larger than the specific distance, control information for activating a compressed mode may be generated, or alternatively, such control information may not be generated.

On the other hand, in the base station 1, the compressed-mode activation control information receiving unit 15 receives, via the receiving unit 12, the above control information sent from the base station 1. In the present example, the compressed-mode activation controlling unit 14 controls the activation of a compressed mode in accordance with the control information received by the compressed-mode activation control information receiving unit 15. More precisely, if control information for activating a compressed mode is received as the above-mentioned control information (or while no control information is received), the compressed-mode activation controlling unit 14 activates a compressed mode. On the other hand, if the above-mentioned compressed-mode activation prohibiting control information is received, the compressed-mode activation controlling unit 14 does not activate the compressed mode.

That is, in the first embodiment described with reference to FIG. 1 and FIG. 2, the base station 1 makes a decision about the activation of a compressed mode based on the distance between the base station 1 and the mobile station 2, while in this modified example the mobile station 2 takes charge of making an equivalent decision and notifies the base station 1 of the decision as control information.

As with the first embodiment, this modified arrangement will also prevent an unnecessary activation of a compressed mode, so that unnecessary processing, such as detection of the adjacent cell and hand over, will be prevented.

[B] Second Embodiment

Figure 4:
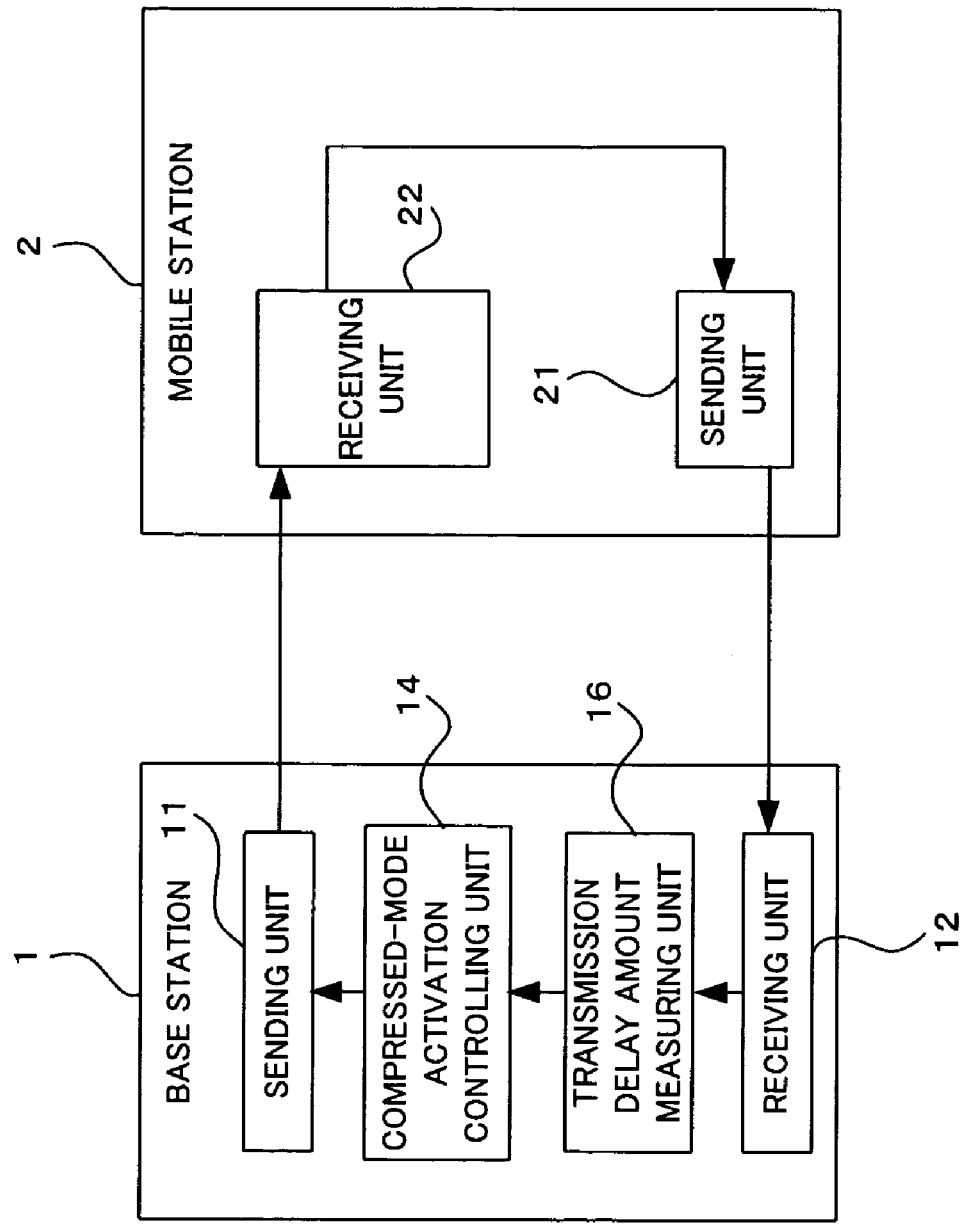
FIG. 4 is a block diagram showing a construction of a W-CDMA mobile communication system according to a second embodiment of the present invention.

FIG. 4 is a block diagram showing a construction of a W-CDMA mobile communication system according to a second embodiment of the present invention. The system of FIG. 4 also includes a base station 1 and a mobile station 2, which can access the base station 1 via a radio channel for communication when located in a cell formed by the base station 1. The important part of the base station 1 includes a sending unit 11, a receiving unit 12, a compressed-mode activation controlling unit 14, and a transmission delay amount measuring unit 16. On the other hand, the important part of the mobile station includes a sending unit 21 and a receiving unit 22.

That is, the system of FIG. 4 differs from the construction already described with reference to FIG. 1 in that the base station 1 of the present embodiment has a transmission delay amount measuring unit 16 in place of the reception level comparing unit 13, and in that the mobile station 2 no longer needs the reception level measuring unit 23 and the reception level notifying unit 24. Like reference numbers and characters designate similar parts or elements throughout several views of the present embodiment and the conventional art unless otherwise described.

Figure 5:
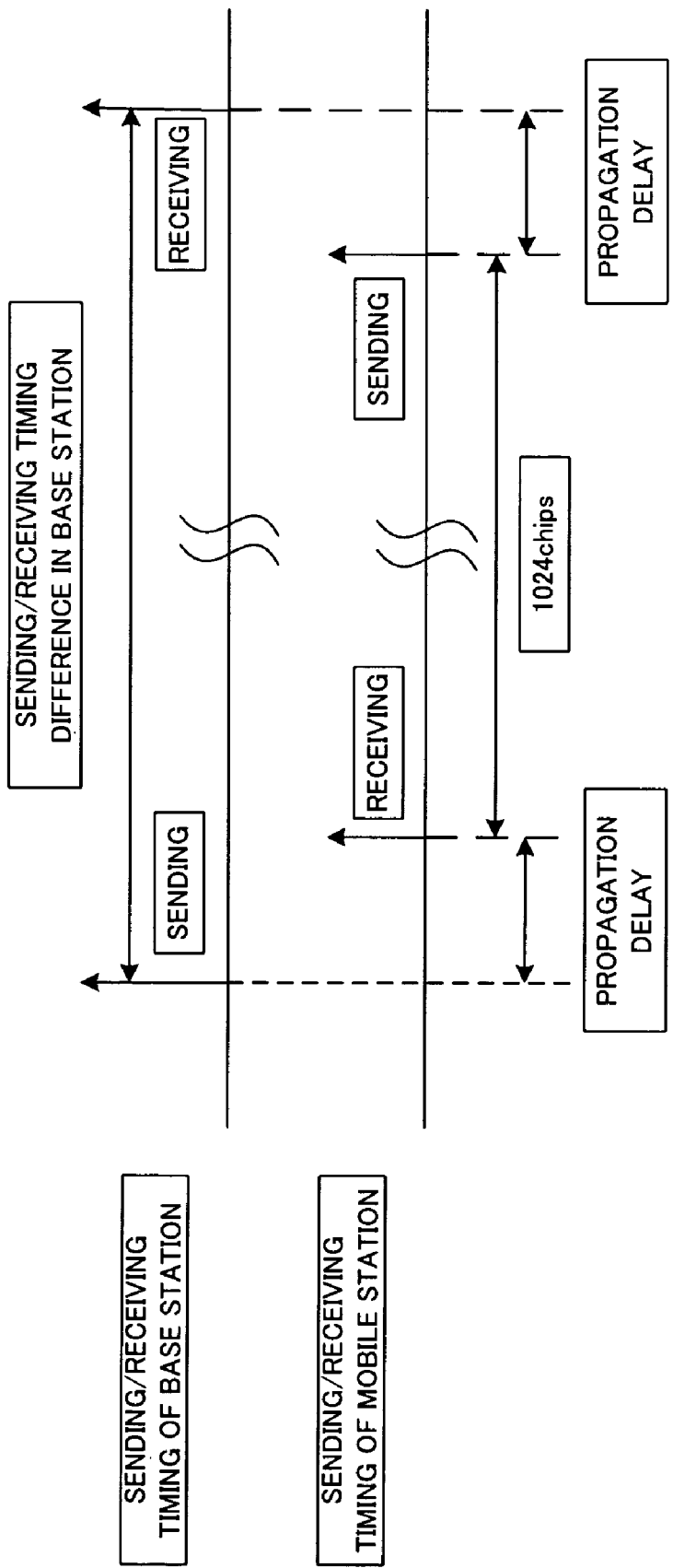
FIG. 5 is a diagram showing an example of sending/receiving timing between a base station and a mobile station in the system of FIG. 4 (in a case where the distance therebetween is large)
Figure 6:
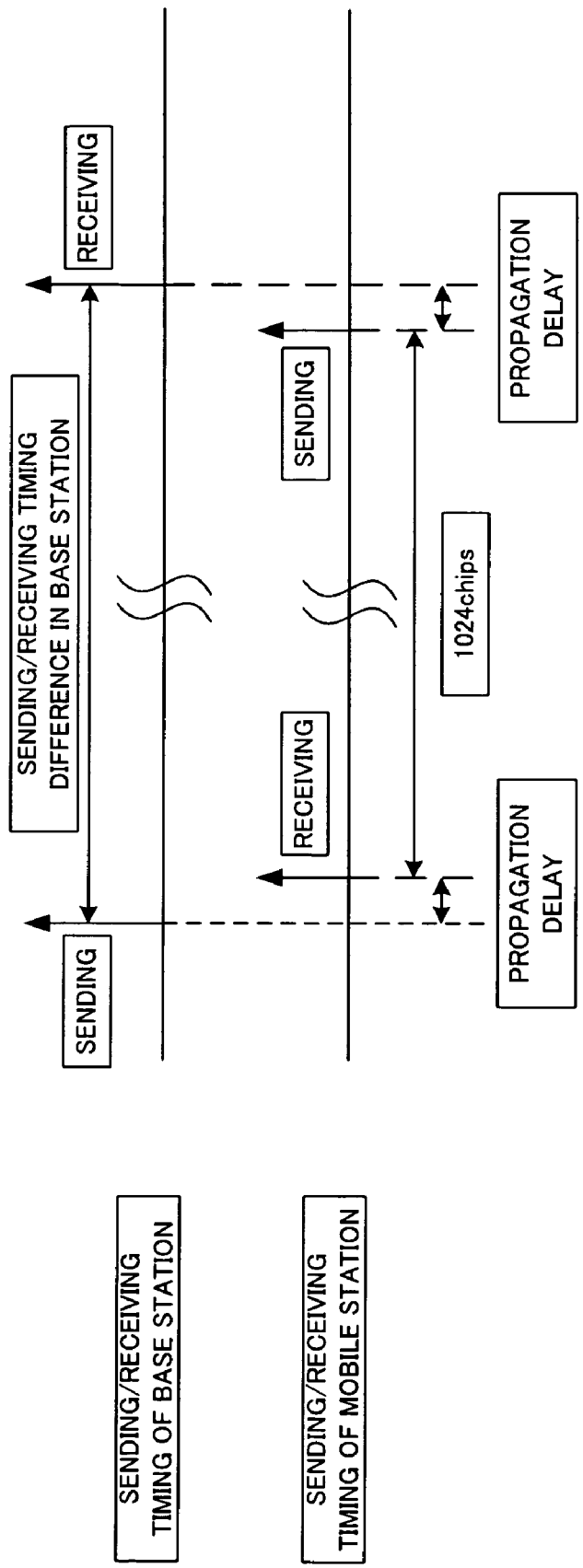
FIG. 6 is a diagram showing an example of sending/receiving timing between a base station and a mobile station in the system of FIG. 4 (in a case where the distance therebetween is small)

Here, the transmission delay amount measuring unit (a distance measuring means, a propagation delay amount distance-estimating unit) 16 of the base station 1 measures (estimates) the distance between the base station 1 and the mobile station 2 based on a difference in transceiving timing in data communication performed between the base station 1 and the mobile station 2. For example, as shown in FIG. 5 and FIG. 6, 3GPP defines that the reception timing of the dedicated channel (DCH) of the mobile station 2 should be apart from its DCH transmission timing by 1024 chips. This means that the smaller the distance between the base station 1 and the mobile station 2, the closer to 1024 chips the transceiving timing difference of DCH of the base station 1, without being affected by the propagation delay (see FIG. 5 and FIG. 6). Here, FIG. 5 shows the transceiving timing in a case where the distance between the base station 1 and the mobile station 2 is large; FIG. 6 shows the transceiving timing in a case where the distance between the base station 1 and the mobile station 2 is small.

More specifically, the amount of propagation delay can be obtained in the following way. Assuming that the velocity of an radio wave is 3×E8 (m/s) and the chip rate is 3.84M (chip/s), the amount of propagation delay due to the distance obtained by calculation is about 1.28 chips per 100 m. Accordingly, the transmission delay amount measuring unit 16 obtains the amount of propagation delay between the base station 1 and the mobile station 2 from the difference between the DCH sending timing from the base station 1 and the DCH receiving timing from the mobile station 2, whereby the distance between the base station 1 and the mobile station 2 is measured (estimated).

In the present example, the compressed-mode activation controlling unit (control means) 14 compares the measured propagation delay amount with a threshold for the propagation delay amount. If the measured propagation delay amount is not larger than the threshold, the compressed-mode activation controlling unit 14 decides that the distance between the base station 1 and the mobile station 2 is small, and does not activate a compressed mode. On the other hand, if the measure propagation delay amount exceeds the threshold value, the compressed-mode activation controlling unit 14 decides that the distance between the base station 1 and the mobile station 2 is large, and activate a compressed mode.

In other words, the compressed-mode activation controlling unit 14 serves both a function of a comparing unit, which performs the above-described threshold comparison, and a function of a compressed-mode activation prohibiting unit, which prohibits the activation of a compressed mode when the comparison result reveals that the distance between the base station 1 and the mobile station 2 is small.

Figure 7:
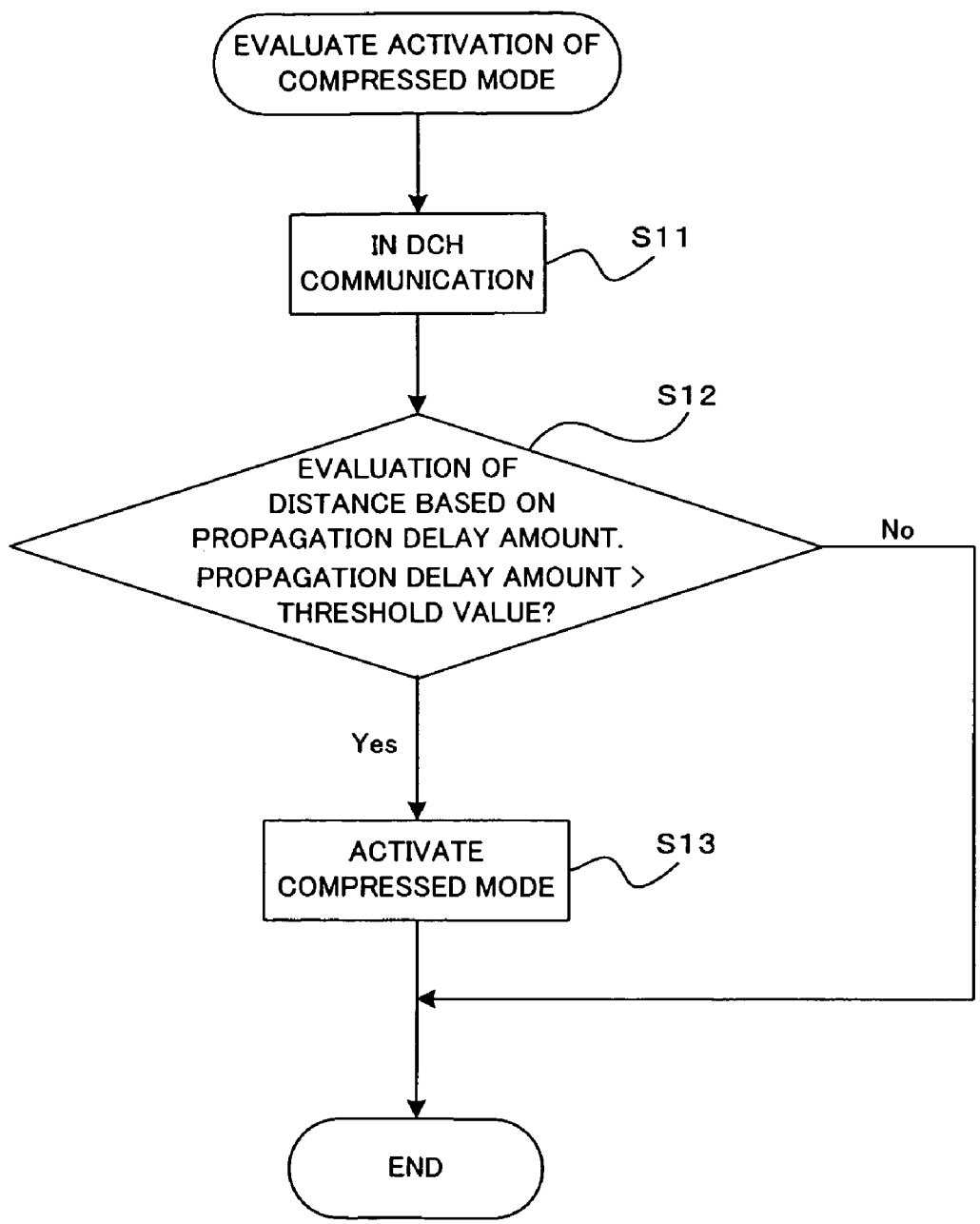
FIG. 7 is a flowchart indicating an operation (compressed mode control method) of the system of FIG. 4.

Now, an operation of a system with the above construction will be described with reference to FIG. 7.

For example, while the mobile station 2 is communicating with the base station 1 over a dedicated channel (DCH)(step S11), the transmission delay amount measuring unit 16 obtains the amount of propagation delay between the base station 1 and the mobile station 2 based on the difference between the DCH sending timing from the base station 1 and the DCH receiving timing from the mobile station 2, and then compares and evaluates the thus obtained propagation delay amount with a threshold value (step S12)

As a result, if it is found that the measured propagation delay amount is larger than the threshold value, a decision is made that the distance between the base station 1 and the mobile station 2 is large. In response to the thus made decision, the compressed-mode activation controlling unit 14 activates a compressed mode (Yes route of step S12 and step S13). In contrast, if the measured propagation delay amount is not larger than the threshold value, a decision is made that the distance between the base station 1 and the mobile station 2 is small. In response to the thus made decision, the compressed-mode activation controlling unit 14 does not activate a compressed mode (No route of step S12).

As described above, the present embodiment evaluates the distance between the base station 1 and the mobile station 2 based on the difference in the transceiving timing (the amount of propagation delay) between the base station 1 and the mobile station 2, and the activation of the compressed mode is restrained in cases where the distance therebetween is smaller than a specific distance. This will prevent an unnecessary activation of a compressed mode, so that unnecessary processing, such as detection of the adjacent cell and hand over, will be prevented more reliably than in the first embodiment.

Here, the distance evaluation based on the propagation delay amount in the present example can be combined with the distance evaluation of the first embodiment and its modification, using the AND condition and/or the OR condition. With this arrangement, further prevention of unnecessary processing, such as detection of the adjacent cell and hand over, will be available.

[C] Third Embodiment

Figure 8:
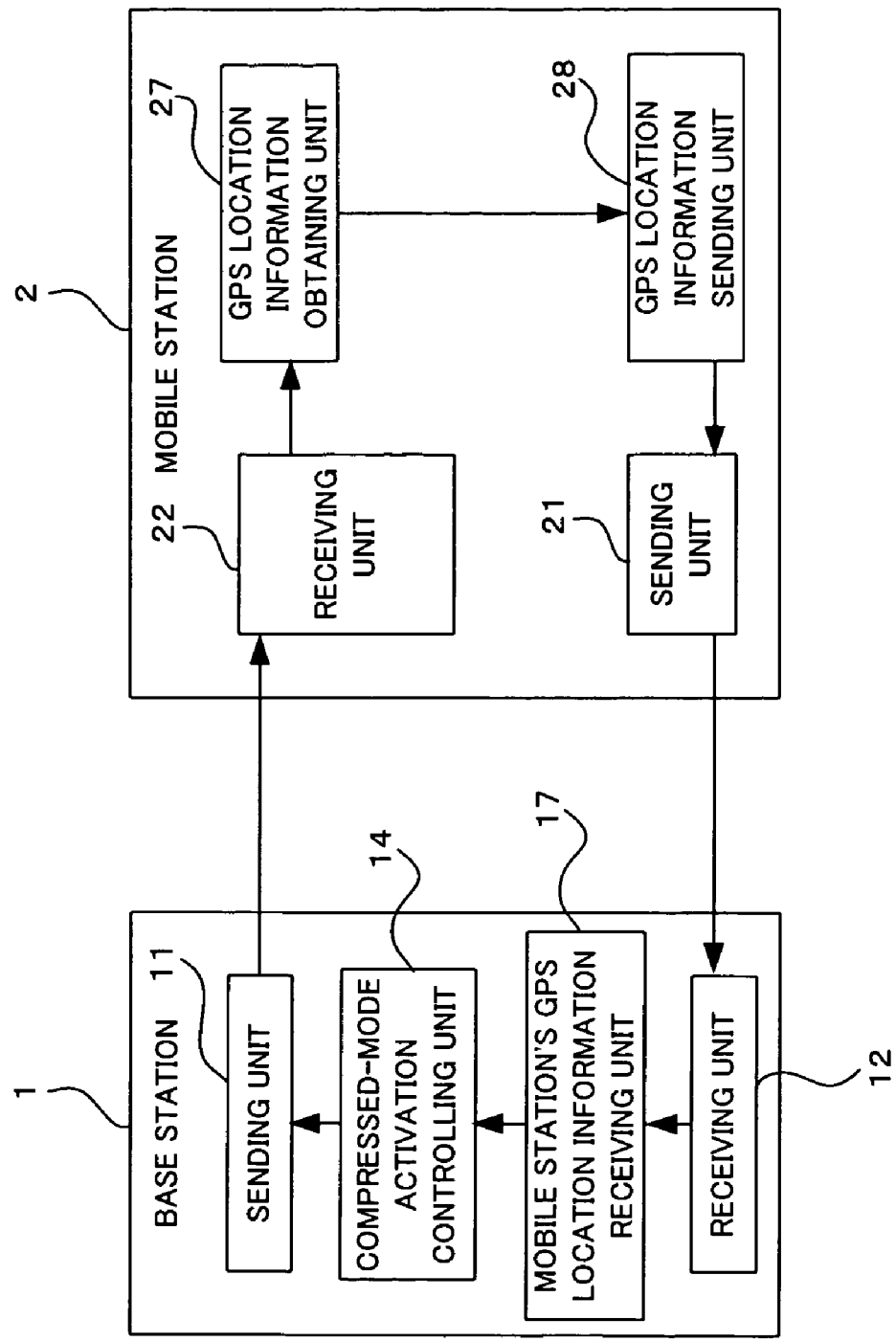
FIG. 8 is a block diagram of a construction of a W-CDMA mobile communication system according to a third embodiment of the present invention.

FIG. 8 is a block diagram of a construction of a W-CDMA mobile communication system according to a third embodiment of the present invention. The system of FIG. 8 also includes a base station 1 and a mobile station 2, which can access the base station 1 via a radio channel for communication when located in a cell formed by the base station 1. The important part of the base station 1 includes a sending unit 11, a receiving unit 12, a compressed-mode activation controlling unit 14, and a mobile station's GPS location information receiving unit 17. On the other hand, the important part of the mobile station includes a sending unit 21, a receiving unit 22, a GPS location information obtaining unit 27, and a GPS location information sending unit 28.

That is, the system of the present embodiment differs from the construction already described with reference to FIG. 1 in that the base station 1 of the present embodiment has a mobile station's GPS location information receiving unit 17 in place of the reception level comparing unit 13, and in that the mobile station 2 has a GPS location information obtaining unit 27 and a GPS location information sending unit 28 in place of the reception level measuring unit 23 and the reception level notifying unit 24. Like reference numbers and characters designate similar parts or elements throughout several views of the present embodiment and the conventional art unless otherwise described.

Here, in the mobile station 2, the GPS location information obtaining unit 27 pinpoints and obtains the location of the mobile station 2 by the GPS (Global Positioning System). The GPS location information sending unit 28 sends the location information obtained by the GPS location information obtaining unit 27 to the base station 1 via the sending unit 21.

On the other hand, in the base station 1, the mobile station's GPS location information receiving unit 17 receives, via the receiving unit 12, the above location information sent from the GPS location information sending unit 28 of the mobile station 2. In this case, the compressed-mode activation controlling unit 14 obtains the distance between the base station 1 and the mobile station 2 based on the received location information, and then controls the activation or the prohibition (restraining) of a compressed mode based on the obtained distance. That is, the mobile station's GPS location information receiving unit 17 serves a function of a GPS distance estimating unit for estimating the distance between the base station 1 and the mobile station 2 based on the result of pinpointing by the GPS.

Figure 9:
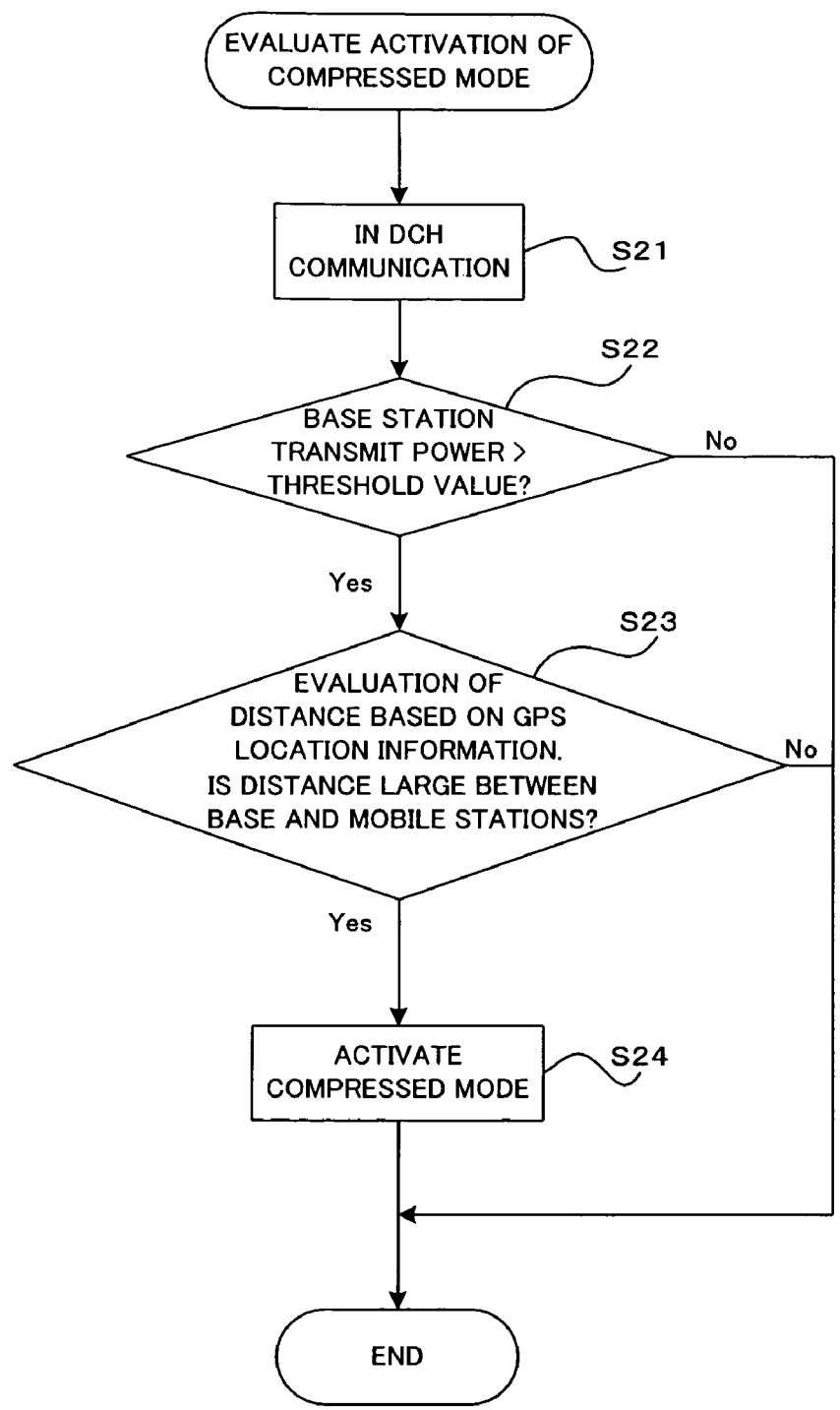
FIG. 9 is a flowchart indicating an operation (compressed mode control method) of the system of FIG. 8.

Now, a specific operation will be described with reference to FIG. 9. For example, while the mobile station 2 is communicating with the base station 1 over a dedicated channel (DCH) (step S21), the GPS location information obtaining unit 27 of the mobile station 2 obtains the current location information (latitude, longitude, altitude, etc.) of the mobile station 2 using the GPS, and then the GPS location information sending unit 28 of the mobile station 2 sends the thus obtained location information to the base station 1 via the sending unit 21. This location information is received by the mobile station's GPS location information receiving unit 17 of the base station 1.

In the base station 1, it is evaluated whether or not the current transmission power exceeds a specific threshold value (step S22). If the evaluation result is negative, the processing ends (No route of step S22). On the other hand, if the evaluation result is positive, the distance between the base station 1 and the mobile station 2 is obtained based on the location information received by the mobile station's GPS location information receiving unit 17, and distance evaluation by comparing the obtained distance and a specific threshold value is performed (from Yes route of step S22 to step S23).

As a result, if a decision is made that the distance between the base station 1 and the mobile station 2 is large, the compressed-mode activation controlling unit 14 activates a compressed mode in response to the thus made decision (from Yes route of step S23 to step S24) If a decision is made that the distance between the base station 1 and the mobile station 2 is small, the compressed-mode activation controlling unit 14 prohibits (restrains) the activation of a compressed mode (No route of step S23).

As described above, the present embodiment makes it possible to accurately evaluate the distance between the base station 1 and the mobile station 2 by means of the GPS. When the distance is smaller than a specific distance, the activation of a compressed mode can be restrained. Hence, in comparison with the first and second embodiments, it is possible with higher accuracy to prevent unnecessary processing, such as detection of the adjacent cell and hand over.

Here, in the present example, the location information obtained by the mobile station 2 is notified to the base station 1, and the base station 1 evaluates the distance between the base station 1 and the mobile station 2, and activates or prohibits a compressed mode based on the evaluation result. However, such location information may be obtained by the base station 1 and notified to the mobile station 2. The mobile station 2 may evaluate the distance between the base station 1 and the mobile station 2, and notifies the base station 1 of the activation/prohibition of a compressed mode.

[D] Fourth Embodiment

Figure 10:
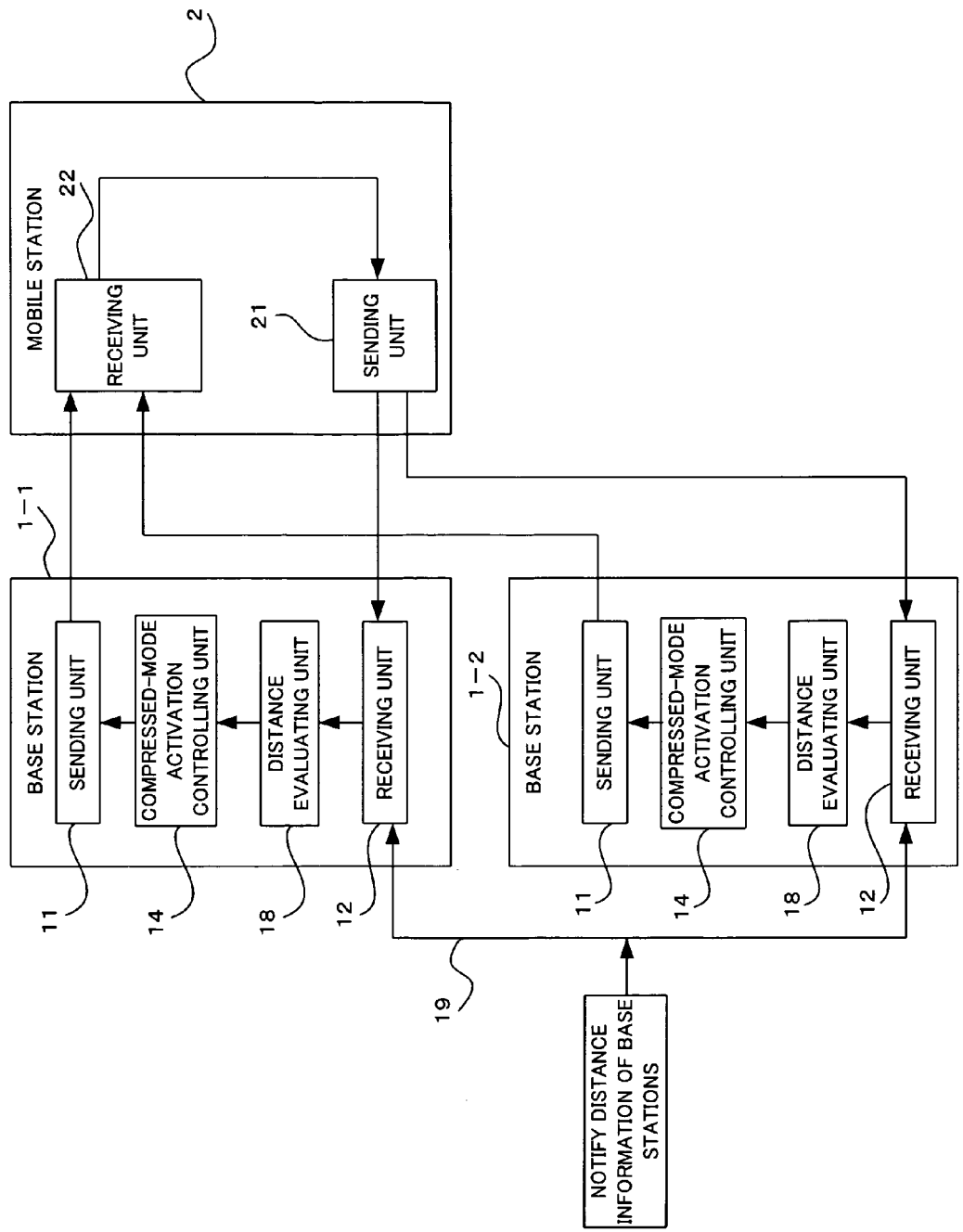
FIG. 10 is a block diagram showing a construction of a W-CDMA mobile communication system according to a fourth embodiment of the present invention.

FIG. 10 is a block diagram showing a construction of a W-CDMA mobile communication system according to a fourth embodiment of the present invention. The system of FIG. 10 includes at least two base stations 1-1, 1-2, and at least one mobile station 2 simultaneously communicable with the two base stations 1-1, 1-2. Each of the base stations 1-1, 1-2 includes a sending unit 11, a receiving unit 12, a compressed-mode activation controlling unit 14, and a distance evaluating unit 18, and the mobile station 2 includes a sending unit 21 and a receiving unit 22.

Here, in the mobile station 2, the sending unit 21 and the receiving unit 22 are the same as those already described. In the base stations 1-1, 1-2, the sending unit 11 and the receiving unit 12 are the same as those already described. Using any of the methods already described in the first through the third embodiment (or in combination), the distance evaluating unit 18 evaluates the distance between the base station 1-1 or 1-2 and the mobile station 2. In the present embodiment, the evaluation result is communicated between the base stations 1 and 2, so that all the base stations 1-1, 1-2 are capable of acknowledging the distances between the base stations 1-1, 1-2 and the mobile station 2 (see line 19 of FIG. 10). That is, the distance evaluating unit 18 of the present example serves a function of a more-than-one distance measuring unit, which measures the distance between the base stations 1-1, 1-2 and the mobile station 2 during communication performed between the mobile station 2 and two or more base stations 1-1, 1-2.

Further, the compressed-mode activation controlling unit (controlling means, compressed-mode activation prohibiting unit) 14 controls the activation of a compressed mode according to the evaluation result of the distance evaluating unit 18. In the present example, if it is decided that the distance between the mobile station 2 and each of the base stations 1-1, 1-2 is large, a compressed mode is activated, and otherwise (if the distance between the mobile station 2 and at least one of the base stations 1-1, 1-2, is smaller than a threshold value and the distance is decided to be small) the compressed mode is not activated (restrained).

Here, in FIG. 10, according to the applied method among the first through the third embodiment (or their combination), the base stations 1-1, 1-2 and the mobile station 2 are equipped with necessary functions already described although their illustrations are omitted for simplification of the illustration.

Figure 11:
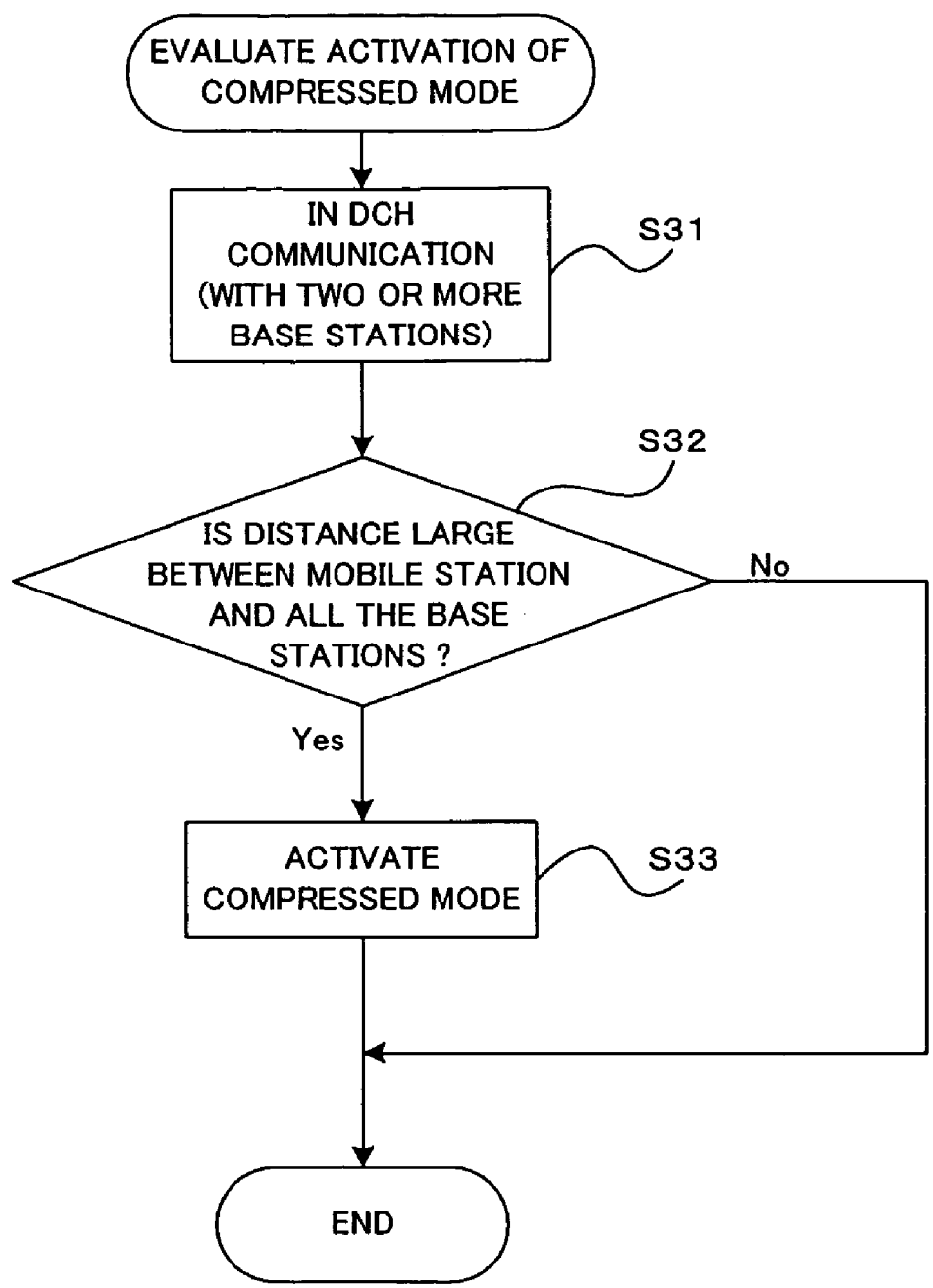
FIG. 11 is a flowchart indicating an operation (compressed mode control method) of the system of FIG. 10.
Figure 12:
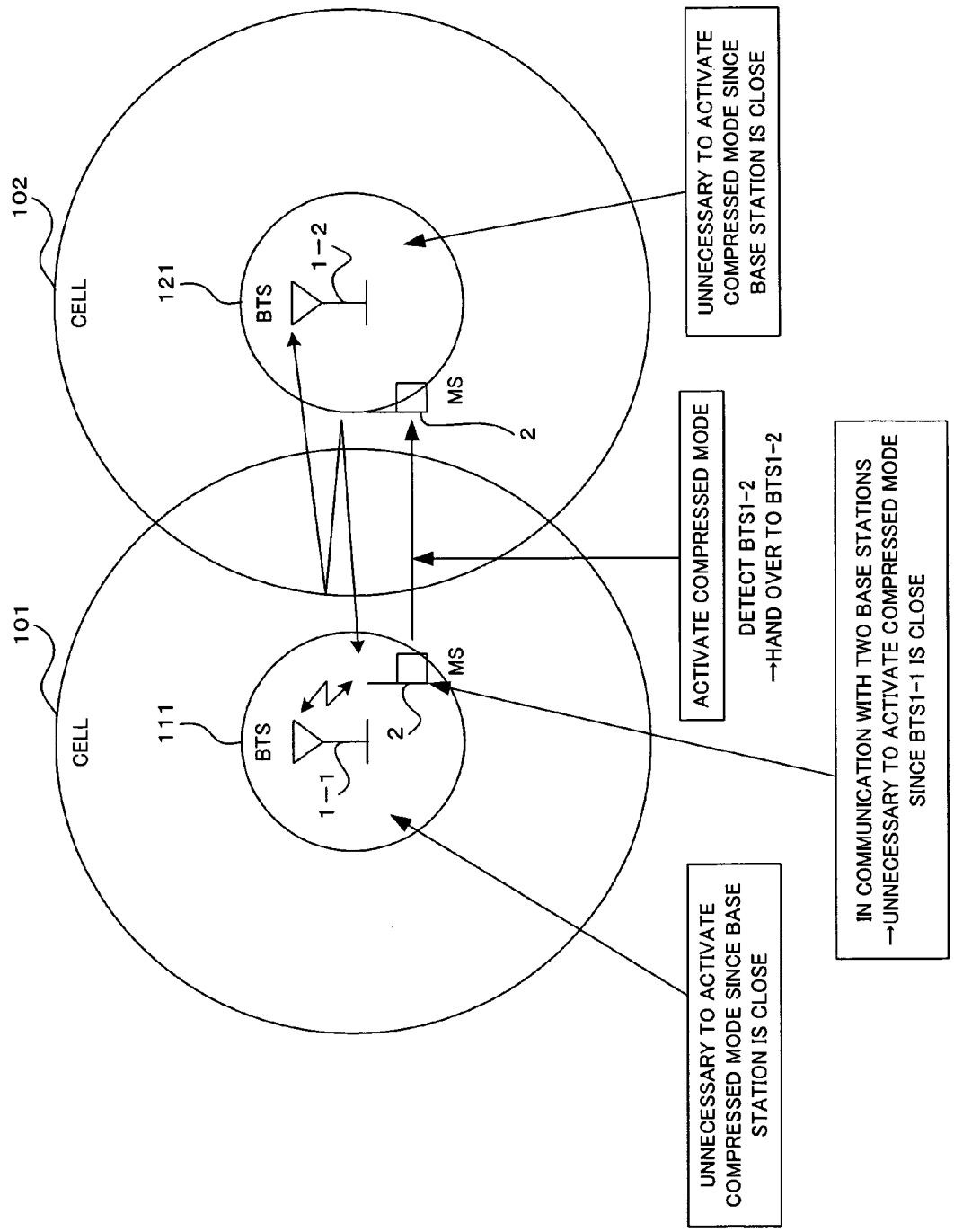
FIG. 12 is a conceptual rendering of an operation (compressed mode control method) of the system of FIG. 10.
Figure 13:
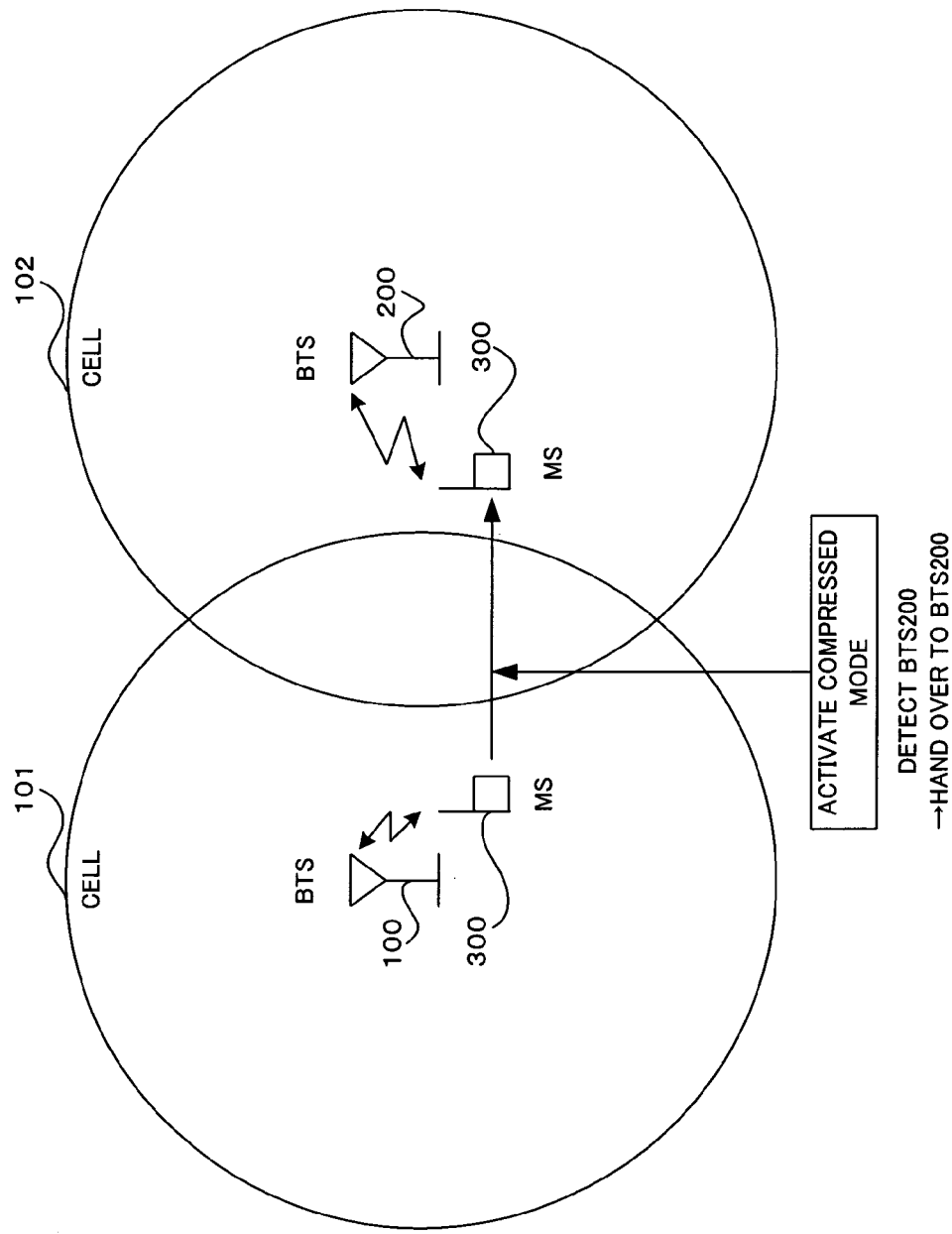
FIG. 13 is a block diagram showing an example of a W-CDMA mobile communication system.
Figure 14:
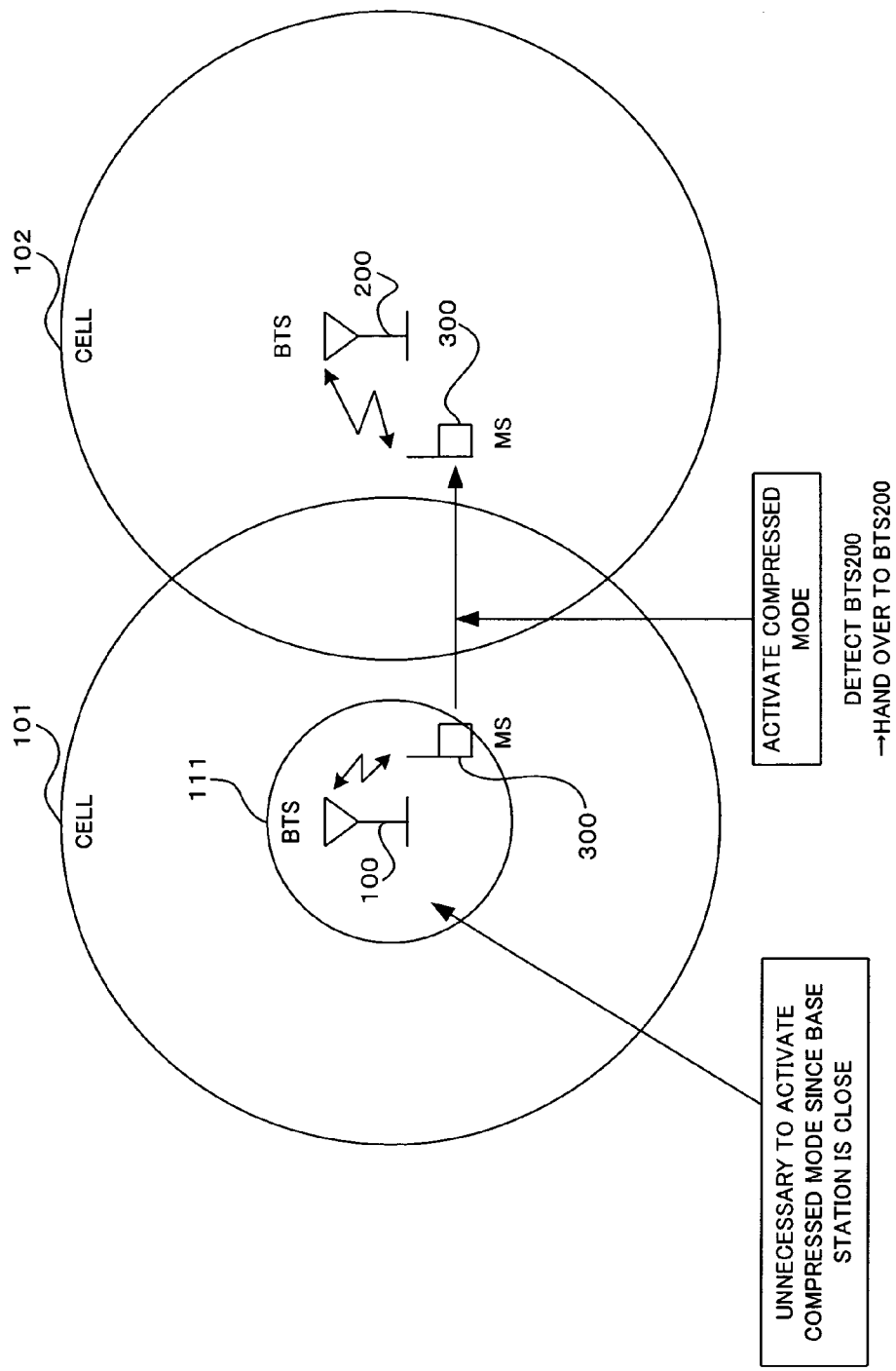
FIG. 14 is block diagram showing an example of a conventional W-CDMA for describing issues to be solved in the conventional art.

Referring to FIG. 11 and FIG. 12, a description will be made hereinbelow of an operation of a system of the present embodiment.

As shown in FIG. 11, for example, while the mobile station 2 is communicating with the base station 1 over a dedicated channel (DCH) (step S31), the distance evaluating unit 18 of the base station 1 evaluates whether or not the distance between the mobile station 2 and each of the base stations 1-1, 1-2 is larger (more distant) than a specific distance (step S32). As a result, if it is evaluated that the distance between the mobile station 2 and every base station 1-1, 1-2 is large, more concretely, if the mobile station 2 is located in neither of the cells 101 and 102, which are formed by the base stations 1-1 and 1-2, respectively (as shown in FIG. 12), the distance evaluating unit 18 activates a compressed mode (from Yes route of step S32 to step S33), or otherwise it ends its processing, so that a compressed mode is not activated (No route of step S32). In the example of FIG. 12, when the mobile station 2 is located in the base station vicinity area 111 or 121, the activation of a compressed mode is prohibited (restrained).

As already described above, according to the present embodiment, while the mobile station 2 is simultaneously communicating with more than one base station 1-1, 1-2, the distance between the mobile station 2 and each of the base stations 1-1 and 1-2 is evaluated by means of any one of the methods described in the first through third embodiments. If it is decided that any of the base stations 1-1, 1-2 is close to the mobile station 2, the activation of a compressed mode is restrained, so that more efficient prevention of unnecessary processing, such as detection of the adjacent cell and hand over, will be available.

Further, the present invention should by no means be limited to the above-illustrated embodiments, but various changes or modifications may be suggested without departing from the gist of the invention.

What is claimed is:

1. A mobile station in a mobile communication system which includes a plurality of base stations and a mobile station communicable with the plurality of base stations, in which mobile communication system a compressed mode can be activated before conducting a hand over, said mobile station comprising:
    a mobile station side distance measuring unit which measures the distance between the mobile station and at least one of the plurality of base stations which is currently in communication with the mobile station by propagation delay amount or a GPS;
    a mobile station side comparing unit which compares the distance measured by the mobile station side distance measuring unit with a threshold value;
    a compressed-mode activation prohibiting control information generating unit which generates compressed-mode activation prohibiting control information for prohibiting the activation of the compressed mode if the distance measured by the mobile station side distance measuring unit is smaller than the threshold value as a result of comparison by the mobile station side comparing unit in communication environments including a communication environment where an actual reception level is lower than a theoretical recetion level corresponding to the distance represented by the threshold value; and
    a compressed-mode activation prohibiting control information sending unit which sends the compressed-mode activation prohibiting control information generated by said compressed-mode activation prohibiting control information generating unit to the base station which is in communication with the mobile station.

2. A mobile communication system including a plurality of base stations and a mobile station communicable with the plurality of base stations, in which mobile communication system a compressed mode can be activated before conducting a hand over, said mobile communication system comprising:
    a distance measuring unit which measures the distance between the mobile station and at least one of the plurality of base stations which is currently in communication with the mobile station by propagation delay amount or a GPS (Global Position System);
    a comparing unit which compares the distance measured by the distance measuring unit with a threshold value; and
    a compressed-mode activation prohibiting unit which prohibits the activation of the compressed mode if the measured distance is smaller than the threshold value as a result of comparison by the comparing unit in communication enviroments including a communication environment where an actual reception level is lower than a theoretical reception level corresponding to the distance represented by the threshold value.

3. A mobile communication system including a plurality of base stations and a mobile station communicable with the plurality of base stations, in which mobile communication system a compressed mode can be activated before conducting a handover, said mobile communication system comprising:
    a distance measuring unit which measures the distances between the mobile station and the plurality of base stations respectively;
    a comparing unit which compares the distances measured by the distance measuring unit with a threshold value; and
    a compressed-mode activation prohibiting unit which prohibits the activation of the compressed mode if at least one of the distances measured by said distance measuring unit is smaller than the threshold value as a result of comparison by the comparing unit in communication environments including a communication environment where an actual reception level is lower than a theoretical reception level corresponding to the distance represented by the threshold value.

4. A mobile communication system as set forth in claim 3, wherein said distance measuring unit measures the distance by using a signal reception level, a GPS, or a propagation delay amount.

5. A compressed-mode controlling method for a mobile communication system which includes a plurality of base stations and a mobile station communicable with the plurality of base stations, in which mobile communication system a compressed mode can be activated before conducting a hand over, said method comprising:
    measuring the distance between the mobile station and at least one of the plurality of base stations which is currently in communication with the mobile station by propagation delay amount or a GPS;
    comparing the distance measured by said measuring with a threshold value; and
    prohibiting the activation of the compressed mode if the measured distance is smaller than the threshold value as a result of the comparison in communication environments including a communication environment where an actual reception level is lower than a theoretical reception level corresponding to the distance represented by the threshold value.

6. A compressed-mode controlling method for a mobile communication system including a plurality of base stations and a mobile station communicable with the plurality of base stations, in which mobile communication system a compressed mode can be activated before conducting a handover, said method comprising:
    measuring the distances between the mobile station and the plurality of base stations respectively;
    comparing the measured distances with a threshold value; and
    prohibiting the activation of the compressed mode if at least one of the measured distances is smaller than the threshold value as a result of the comparison in communication environments including a communication environment where an actual reception level is lower than a theoretical reception level corresponding to the distance represented by the threshold value.

7. A compressed-mode controlling method as set forth in claim 6, wherein the distance is measured based on a signal reception level, a GPS, or a propagation delay amount.

8. A base station in a mobile communication system which includes a plurality of base stations and a mobile station communicable with the plurality of base stations, in which mobile communication system a compressed mode can be activated before conducting a hand over, said base station comprising:
- a base station side distance measuring unit which measures the distance between the mobile station and at least one of the plurality of base stations which is currently in communication with the mobile station by propagation delay amount or a GPS;
- a base station side comparing unit which compares the distance measured by the base station side distance measuring unit with a threshold value; and
- a compressed-mode activation prohibiting unit which prohibits the activation of the compressed mode if the distance measured by the base station side distance measuring unit is smaller than the threshold value as a result of comparison by the base station side comparing unit in communication environments including a communication environment where an actual reception level is lower than a theoretical reception level corresponding to the distance represented by the threshold value.

9. A base station in a mobile communication system which includes a plurality of base stations and a mobile station communicable with the plurality of base stations, in which mobile communication system a compressed mode can be activated, said base station comprising:
- a base station side distance measuring unit which measures the distances between the mobile station and the plurality of base stations respectively;
- a base station side comparing unit which compares the distances measured by the base station side distance measuring unit with a threshold value; and
- a compressed-mode activation prohibiting unit which prohibits the activation of the compressed mode if at least one of the distances measured by said base station side distance measuring unit is smaller than the threshold value as a result of comparison by the base station side comparing unit in communication environments including a communication environment where an actual reception level is lower than a theoretical reception level corresponding to the distance represented by the threshold value.

10. A base station as set forth in claim 9, wherein said base station side distance measuring unit measures the distance by using a signal reception level, a GPS, or a propagation delay amount.

\* \* \* \* \*